June 17, 1958     K. WILFERT     2,839,329
VEHICLE FRAME CONSTRUCTION
Filed March 8, 1955     2 Sheets-Sheet 1

INVENTOR
KARL WILFERT

BY *Dicke and Craig*

ATTORNEYS

June 17, 1958 K. WILFERT 2,839,329
VEHICLE FRAME CONSTRUCTION
Filed March 8, 1955 2 Sheets-Sheet 2
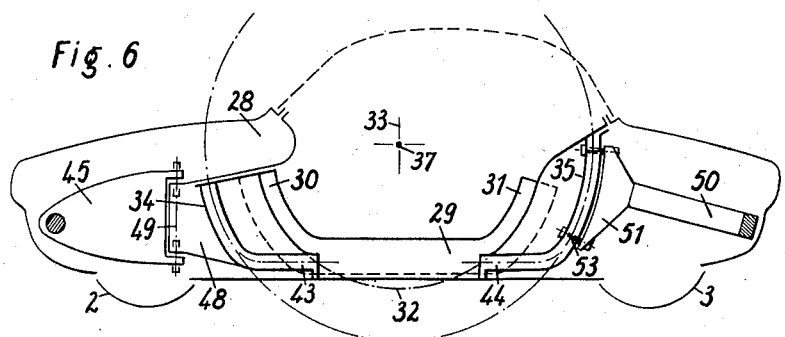
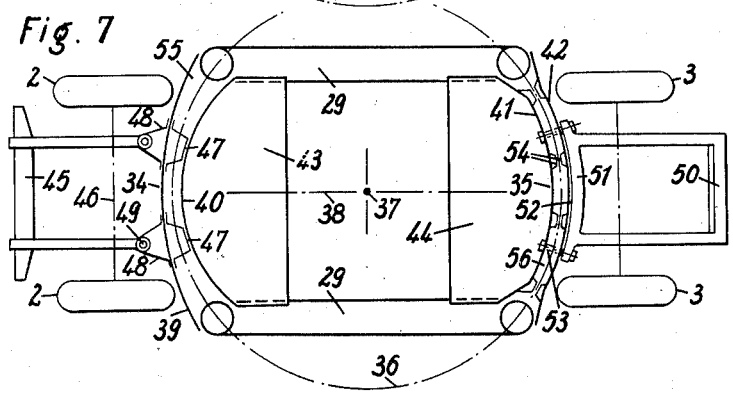
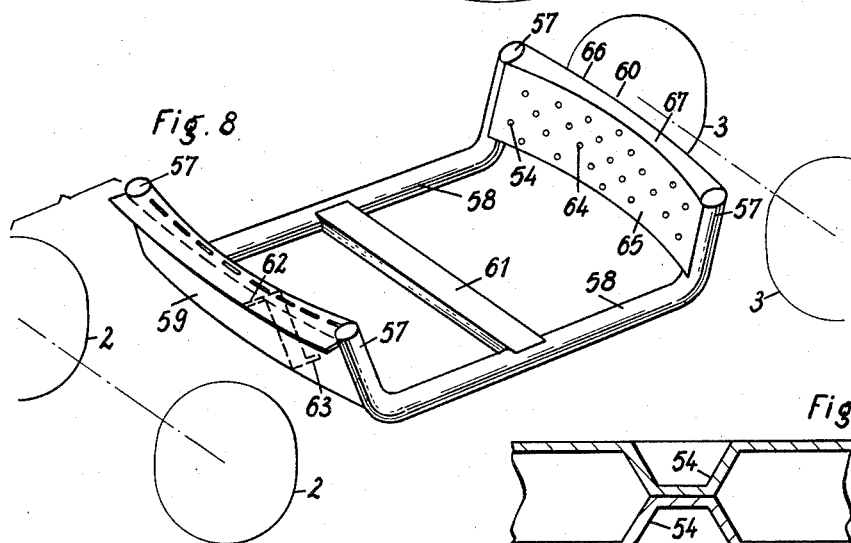
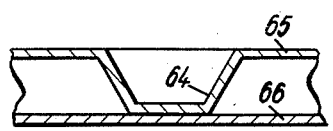
INVENTOR
KARL WILFERT
BY Dicke and Craig
ATTORNEYS United States Patent Office 2,839,329
Patented June 17, 1958

2,839,329

VEHICLE FRAME CONSTRUCTION

Karl Wilfert, Stuttgart-Degerloch, Germany, assignor to Daimler-Benz Aktiengesellschaft, Stuttgart-Unterturkheim, Germany Application March 8, 1955, Serial No. 492,831

15 Claims. (Cl. 296—28)

The present invention relates to automobile frames, and more particularly to a frame for passenger cars, the width of which exceeds that of the tread base of the car.

It is the principal object of the present invention to provide a car frame consisting of longitudinal and transverse supporting members of the same or substantially similar profile which is designed to have a great canting and shearing strength.

This object of the present invention is principally obtained by the combination in one new structure of several individual features and characteristics of design, some of which are known individually.

One of the individual features of the new combination consists in bending the longitudinal frame members which also form the lateral limitations of the frame, in an upward direction at a point forwardly of the car behind the front wheels and/or at the rear of the car in front of the rear wheels.

Another essential feature of the new combination consists in designing and constructing a transverse front and/or rear wall of the car which lies substantially within the plane of the bent or angular longitudinal frame members and is connected thereto, so as to constitute the sole front and/or rear transverse supporting member of the frame, and in the form of a rigid double wall.

Another feature of the invention consists in providing the two individual walls of such double wall of different curvatures, especially toward the adjacent end of the car.

Another feature of the present invention resides in curving at least one double wall substantially spherically or into a ball-cup shape, with the center of such a sphere or cup preferably lying within the vertical line of intersection between the central vertical plane extending in the longitudinal direction of the car and the central vertical plane extending in the transverse direction of the car.

According to another feature of the invention, the two individual walls of the double wall structure are preferably spaced apart and secured to each other by suitable reinforcing elements, preferably of structural steel.

Further objects, features, and advantages of the present invention will be apparent from the following detailed description thereof and the accompanying drawings, in which—

Fig. 6 is a longitudinal section of a car frame according to a fourth embodiment of the invention;

Fig. 7 is a top view of the car frame shown in Fig. 6;

Fig. 8 is a perspective view of a fifth embodiment of the invention; while

Figs. 9 and 10 are partial cross sections of a double wall with depressed portions in one or both wall portions, respectively, for reinforcing the double wall structure.

Figure 1:
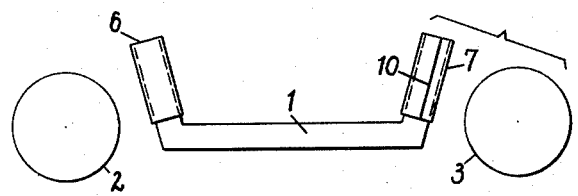
Fig. 1 shows a longitudinal section through a car frame according to the invention.
Figure 2:
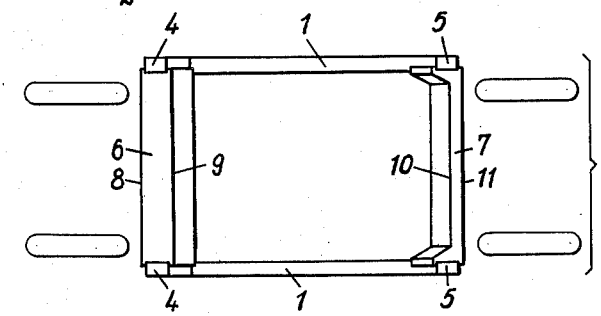
Fig. 2 is a top view of a frame as shown in Fig. 1.

Referring to the drawings, and particularly to Figs. 1 and 2 thereof, the car frame consists of two longitudinal frame members 1 of a boxlike cross section which are bent upwardly at the front part of the car behind the front wheels 2, and in the rear in front of the rear wheels 3. The car frame is devoid of the usual cross members, and its angular front and rear parts 4 and 5 of the longitudinal supports 1 are interconnected by rigid, self-supporting double walls 6 and 7, respectively, which form the sole front and rear cross members of the car frame. Whereas the two individual walls of the front double wall 6 are entirely flat, spaced from, and parallel to each other, the inwardly facing wall 10 of double wall 7 intermediate the rear angular parts 5 of longitudinal supports 1 is placed closely adjacent to the outer wall 11 of double wall 7. However, the main central part of this wall 10 intermediate the two parts 5 of the longitudinal supports 1 is likewise made flat and parallel to the entirely flat wall 11.

Figure 3:
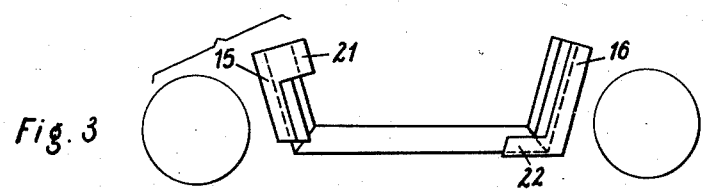
Fig. 3 is a longitudinal section through a car frame in accordance with a second embodiment of the invention.
Figure 4:
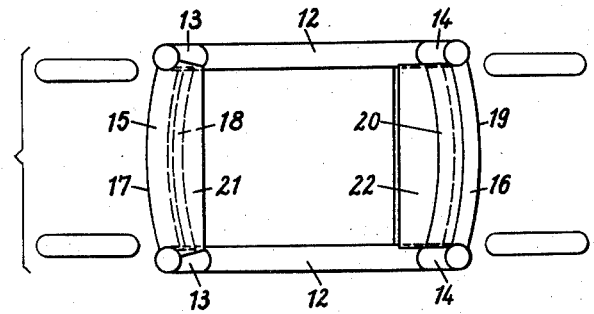
Fig. 4 is a top view of a frame as shown in Fig. 3.

The car frame according to the second embodiment of the invention as shown in Figs. 3 and 4 has two tubular longitudinal supports 12, the two opposite ends of which are bent upwardly, and are rigidly interconnected at the point of their front and rear bends 13 and 14, respectively, by rigid, self-supporting front and rear double walls 15 and 16, respectively. Both double walls 15 and 16 are likewise made of individual parallel walls 17 and 18, and 19 and 20, respectively, each double wall being, however, curved outwardly toward the respective adjacent end of the car. The front twin wall 15 also has an upper flangelike reinforcement 21 extending along its horizontal upper edge in a rearward direction of the car frame. A similar flangelike reinforcement is also provided on the rear, double wall 16 which, however, extends along its horizontal lower edge in a forward direction of the car frame. The passenger space between the two double walls 15 and 16 is not obstructed by the reinforcements 21 and 22 since the front reinforcement is provided above the foot level, its side facing the middle of the passenger compartment at the same time serving, for example, as an instrument panel, while the rear reinforcement 22 of the preferred embodiment of the invention extends underneath the passenger seats (not shown) or even below the floor boards.

Figure 5:
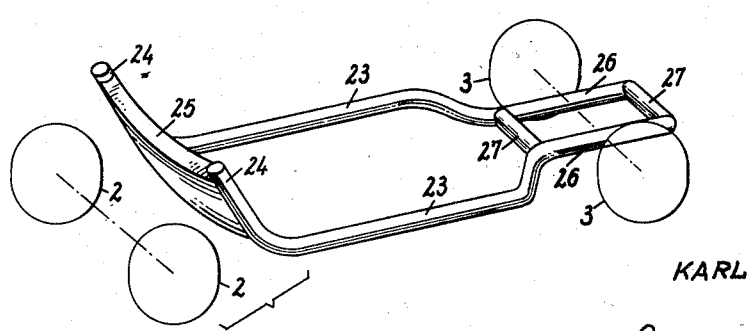
Fig. 5 is a perspective view of a third embodiment of the invention.

The third embodiment of the invention as shown in Fig. 5 has upwardly bent portions 24 only at the front end of the longitudinal supports 23, these portions being rigidly interconnected by a double wall 25 which at the same time serves as a sole front support. The rear part of this frame projects between the rear wheels 3 up to the rear end of the car, the two longitudinal supports being bent toward each other, that is, toward the central longitudinal plane of the car, and then continuing side-by-side toward the rear. At the rear ends 26 which are closely spaced from each other, the two longitudinal supports are interconnected by two ordinary transverse members 27.

In the fourth embodiment of the invention as shown in Figs. 6 and 7, the car frame consists of two longitudinal supports 29 of tubular cross section extending along both sides of the tread base of the car 28. These longitudinal supports 29 are likewise bent upwardly at their front and rear ends, that is, behind the front wheels 2 and in front of the rear wheels 3, respectively. As shown particularly in Fig. 6, the bent end portions 30 and 31 do, however, not extend obliquely upward along a straight line, but they are curved upward so that both follow a circular arc 32, the center of which lies above the upper edge of the tires of the front and rear wheels 2 and 3, respectively, and within the central vertical transverse plane 33 of the car. Both curved end parts 30 and 31 are also provided with the sole transverse connection between the longitudinal supports 29 in the form of a front double wall 34 and a rear double wall 35, both of which are curved in the direction toward the respective end of the car so as to form parts of a spherical shell 36. The center 37 of such spherical shell 36 lies within the vertical line of intersection between the central vertical longitudinal plane 38 and the central vertical transverse plane 33 of the car and at the same level as the center of the circle 32.

Whereas the front double wall 34 of the embodiments of the invention shown in Figs. 6 and 7 terminates at its upper end approximately at the upper edge of the front part of the longitudinal support 30, the rear double wall 35 projects considerably beyond the upper edge of the rear part 31 of the support 29 but with its own upper edge being practically on the same level as the center 37 of the spherical shell 36.

Furthermore, whereas the outer wall 39 of the front double wall 34 is less curved toward the adjacent front end of the car than the inner wall 40, the two individual walls 41 and 42 of the rear double wall 35 are substantially parallel to each other. Also, the lower part of both double walls 34 and 35 are extended toward the middle of the car frame parallel to the central parts of the longitudinal supports, and there terminate into parts 43 and 44, respectively, of a floor plate (not shown). The car frame thus composed of the longitudinal supports 29 and the double walls 34 and 35 is extremely solid and rigid, and has a very high canting and shearing strength.

For safely securing to the front double wall 34 a front end part 45 of the car frame, which also carries the front axle 46 and the front wheels 2, each of the respective mounting points are also provided intermediate the two individual walls 39 and 40 with a spacing or bracing element 47 consisting of structural steel of suitable dimensions. Thus, any forces coming from the front part 45 and acting upon the outer wall 39 of the double wall 34 are uniformly transmitted to the inner wall 40 thereof. Two additional flanges 48 which extend along the outside of the double wall 34 and vertically to the respective spacing element 47 are secured to the latter through the wall 39, and serve to connect the front part 45 to the double wall 34 so as to be removable therefrom. The removable connection itself may consist, for example, of a vertical arm 49 which is pivotably mounted and resiliently connects the front part 45 with the double wall 34.

For rigidly securing the rear end 50 of the car frame to the rear double wall 35, this end part 50 is provided with an intermediate connecting member 51 which has a relatively large surface of a shape corresponding to the spherical shape of the rear double wall. This connecting member 51 is secured on both the inner and outer walls 41 and 42 of the double wall 35 by a plurality of spacing tubes 53. The two individual walls 41 and 42 are further reinforced relative to each other by being provided with depressions 54 which are facing each other and by means of which they are rigidly secured to each other in a manner as illustrated in Fig. 10.

The intermediate spaces 55 and 56 between the individual walls 39 and 40, and 41 and 42, respectively of the two double walls 34 and 35 may also be utilized as an air channel for a ventilating and heating system, the other parts of which are not specifically shown in the drawings, as they do not form a part of the invention.

In the fifth embodiment of the invention as shown in Fig. 8, the car frame is provided with double walls 59 and 60 which are likewise spherically curved toward the respective adjacent car end intermediate the two upwardly bent ends 57 of the longitudinal supports 58. These double walls 59 and 60 also serve as sole front and rear transverse supports of the car frame. Since the end parts 57, and thus also the double walls 59 and 60 are of only low height which does not exceed the height of the upper edges of the front wheels 2 and rear wheels 3, this car frame is additionally reinforced at its central transverse plane by a transverse support 61. Furthermore, the front double wall 59 may be provided with upper and lower flangelike reinforcements 62 and 63 with the upper reinforcement 62 being directed toward the adjacent end of the car, and the lower reinforcement 63 toward the middle of the car, as previously described. The rear double wall 60 is provided with reinforcements in the shape of depressions 54 and 64, with the depressions 64 which are located in the vicinity of the central longitudinal plane of the car being provided only in the inner wall 65, as illustrated in Fig. 9, and the outer depressions 54, because of the larger distance between the individual walls of the twin wall 60, in both walls 65 and 66 in the manner as shown in Fig. 10.

Finally, the clearance 67 between the two walls 65 and 66 of the rear double wall 60 of the car frame as shown in Fig. 8 is also designed to be utilized as an air channel for equalizing the pressure of the air surrounding the car in a vertical transverse direction thereof.

Evidently, the clearance between the individual walls of any double wall may, with such double wall being designed accordingly, also be utilized as an air channel for equalizing the pressure of the air surrounding the car also in a horizontal transverse direction thereof. This may be accomplished, for example, by continuing the respective outer walls of a double wall outside of the interconnected end parts of the longitudinal supports directly up to the outer covering of the car, and by bridging the clearance between the two individual walls of the respective double wall on both sides by suitable slots provided between the individual outer wall and the adjacent end part of the longitudinal support, as well as in the adjacent outer covering of the car, so as to connect such clearance on both sides of the car directly with the outer air.

Finally, the clearance between the individual walls of each double wall may, according to the invention, furnish a very simple means of insulating the central passenger compartment of a car against other than temperature influences, that is, for example, soundproof the passenger compartment.

Although my invention has been illustrated and described with reference to the preferred embodiments thereof I wish to have it understood that it is in no way limited to the details of such embodiments or to the specific examples described, but is capable of numerous modifications within the scope of the appended claims.

Having thus fully disclosed my invention, what I claim is:

1. In a passenger car, in combination, a car frame having a width exceeding the tread base of the car and comprising a pair of longitudinal supports limiting the frame in lateral directions, at least one end of said supporting members being bent upwardly at a point near the wheels of the car and intermediate the wheels and the center of the car, at least one transverse wall located substantially between the bent ends of said longitudinal supports and being connected thereto, said transverse wall comprising two individual walls and means for connecting said two walls so as to form a rigid double wall, said double wall constituting the sole transverse support of said frame.

2. In a passenger car, in combination, a car frame having a width exceeding the tread base of the car and comprising a pair of longitudinal supports limiting the frame in lateral directions, the front and rear ends of said supporting members being bent upwardly at a point behind the front wheels and in front of the rear wheels of the car, respectively, a pair of transverse walls each being located substantially between the respective bent ends of said longitudinal supports and connected thereto, said transverse walls each comprising two individual walls and means for connecting said two walls so as to form a rigid double wall, said double walls constituting the sole transverse supports of said frame.

3. A car frame as defined in claim 1, wherein the two individual walls of said double wall have a different curvature bent in the direction toward the adjacent end of the car.

4. A car frame as defined in claim 1, wherein the two individual walls of said double wall have a different curvature bent in the direction toward the adjacent end of the car, the individual wall facing the adjacent end of the car being less curved toward said end than the other wall facing the middle of the car.

5. A car frame as defined in claim 1, wherein at least one double wall is substantially spherically curved in the direction toward the adjacent end of the car.

6. A car frame as defined in claim 2, wherein the two individual walls of at least one of said double walls have a different curvature bent in the direction toward the adjacent end of the car, and wherein at least one double wall has an average curvature of substantially spherical shape.

7. A car frame as defined in claim 1, where at least one double wall is substantially spherically curved in the direction toward the adjacent end of the car, the center of curvature lying substantially within the vertical line of the intersection between the central vertical plane extending in a longitudinal direction of the car and the central vertical plane extending in a transverse direction of the car.

8. A car frame as defined in claim 1, wherein at least one double wall is substantially spherically curved in the direction toward the adjacent end of the car, the center of curvature lying substantially within the vertical line of intersection between the central vertical plane extending in a longitudinal direction of the car and the central vertical plane extending in a transverse direction of the car, and substantially at the same level as the upper edge of said double wall.

9. A car frame as defined in claim 2, wherein the two individual walls of at least one of said double walls have a different curvature bent in the direction toward the adjacent end of the car, and wherein at least one double wall has an average curvature of substantially spherical shape, the center of curvature lying substantially within the vertical line of intersection between the central vertical plane extending in a longitudinal direction of the car and the central vertical plane extending in a transverse direction of the car, and substantially at the same level as the upper edge of the higher of said two twin walls.

10. A car frame as defined in claim 1, further comprising spacing elements intermediate the two individual walls of said double wall, said spacing elements being formed of structural steel.

11. A car frame as defined in claim 2, wherein said two double walls are of a height substantially exceeding the height of the upper edges of the wheels of the car.

12. A car frame as defined in claim 2, wherein said two double walls are of a height not exceeding the height of the upper edges of the wheels of the car, and wherein said frame aside from said two double walls comprises a single central transverse support.

13. A car frame as defined in claim 1, wherein the clearance between the two individual walls of said double wall serves as an air channel for ventilating the interior of the car.

14. A car frame as defined in claim 2, wherein the clearance between the two individual walls of at least one of said double walls serves as an air channel for ventilating and heating the interior of the car.

15. A car frame as defined in claim 2, wherein the clearance between the two individual walls of both of said double walls serves as an insulation of the passenger compartment of said car.

References Cited in the file of this patent

UNITED STATES PATENTS

| | | |
|---|---|---|
| 1,633,093 | Gurney | June 21, 1927 |
| 1,736,548 | Pye | Nov. 19, 1929 |
| 2,100,561 | Kliesrath | Nov. 30, 1937 |
| 2,111,563 | Kliesrath | Mar. 22, 1938 |

FOREIGN PATENTS

| | | |
|---|---|---|
| 68,924 | Denmark | Mar. 28, 1949 |
| 820,379 | Germany | Nov. 8, 1951 |
| 688,982 | Great Britain | Mar. 18, 1953 |